(12) United States Patent
Matsumoto et al.

(10) Patent No.: US 7,215,335 B2
(45) Date of Patent: *May 8, 2007

(54) IMAGE GENERATING APPARATUS, IMAGE GENERATING METHOD, AND COMPUTER PROGRAM

(75) Inventors: Reiji Matsumoto, Tsurugashima (JP); Hajime Adachi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 272 days.

This patent is subject to a terminal disclaimer.

(21) Appl. No.: 10/253,802

(22) Filed: Sep. 25, 2002

(65) Prior Publication Data

US 2003/0071809 A1    Apr. 17, 2003

(30) Foreign Application Priority Data

Sep. 26, 2001    (JP)    ............................. 2001-295140

(51) Int. Cl.
    *G06T 15/00*    (2006.01)
(52) U.S. Cl. ...................................... 345/419; 701/200
(58) Field of Classification Search ................. 345/419
    See application file for complete search history.

(56) References Cited

U.S. PATENT DOCUMENTS

| | | | | |
|---|---|---|---|---|
| 5,189,430 A * | 2/1993 | Yano et al. | ................. | 342/457 |
| 5,925,091 A * | 7/1999 | Ando | ......................... | 701/212 |
| 5,941,934 A * | 8/1999 | Sato | ............................ | 701/217 |
| 6,169,552 B1 * | 1/2001 | Endo et al. | ................. | 345/427 |
| 6,324,469 B1 * | 11/2001 | Okude et al. | ............... | 701/208 |
| 6,421,604 B1 * | 7/2002 | Koyanagi et al. | ........... | 701/208 |
| 6,480,786 B2 * | 11/2002 | Watanabe et al. | ........... | 701/211 |

FOREIGN PATENT DOCUMENTS

| | | |
|---|---|---|
| JP | A 8-16822 | 1/1996 |
| JP | A 9-292830 | 11/1997 |
| JP | A 10-21420 | 1/1998 |
| JP | A 11-174952 | 7/1999 |
| JP | A 11-232484 | 8/1999 |
| JP | A 2000-293705 | 10/2000 |
| JP | 2002-293705 | 10/2002 |

OTHER PUBLICATIONS

Computer Graphics: Principles and Practice. Foley et al. Addison-Wesley Publishing Company, Inc. 1997. pp. 166-170; 873-874.*

* cited by examiner

Primary Examiner—Kee M. Tung
Assistant Examiner—Peter-Anthony Pappas
(74) Attorney, Agent, or Firm—Young & Thompson

(57) ABSTRACT

A picture generating apparatus (1) is provided with: a drawing application processor (11) for instructing a drawing device (13) to generate a 3D image; and a graphics library (12). The drawing application processor is provided with a drawing object information generation device for generating drawing object information to generate an image; and a coordinate transformation information generation device for generating coordinate transformation information. The drawing device generates the 3D image by applying the coordinate transformation information to the drawing object information. Consequently, this ensures the high-speed generation of the image and the ability of replacement of the drawing device.

19 Claims, 8 Drawing Sheets

IMAGE GENERATING APPARATUS, IMAGE GENERATING METHOD, AND COMPUTER PROGRAM

BACKGROUND OF THE INVENTION

1. Field of the Invention

The present invention relates to an image generating apparatus for and an image generating method of generating a three-dimensional (3D) image on the basis of three-dimensional coordinate information, which is applied to a navigation system or the like, and a computer program to perform the image generating method.

2. Description of the Related Art

Recently, the research development of an electronic control for controlling a drive of a car and the spread of a navigation system for supporting a drive are remarkable. In general, the navigation system is basically designed so as to have various databases and to display map information, current position information, various guidance information, etc. on a display unit. Moreover, such a navigation system is typically designed so as to search for a drive route in accordance with an input condition. It is further designed so as to display the searched drive route and a current position based on a GPS (Global Positioning System) measurement or a self-contained measurement on a map and carry out guidance (navigation) to a destination.

Moreover, in some types of navigation systems, a view on a front side from a currently driving point in addition to the drive route is displayed on a display unit. In addition, an indication of a driving lane, a direction to be curved at a crossing, a distance to a crossing, a distance to a destination, an arrival expectation time and the like are displayed. In such navigation systems, the forward view is displayed as a 3D image in perspective, which is a technique for drawing a 3D image on a plane on the basis of view point of a viewer.

Furthermore, some types of navigation systems is designated to change the forward view displayed as a 3D image according to an advance of a car in order to reproduce the change of the actual view that a driver watches in the car through the front window of the car while driving.

By the way, in order to display a 3D image that continuously changes, it is required to calculate enormous map data containing three-dimensional coordinate information at a high speed, input the data obtained by calculating to a drawing device one after another, and generate many 3D images in a shot time. In response to such a requirement, the technique that a single sequence of data is generated by mixing drawing object information indicating objects to be drawn such as a road, a building and so on and the coordinate transformation information indicating a view point, a field of view, a light source and so on, and a 3D image is generated at a time by using the single sequence of data. For example, the display list of OpenGL developed by Silicon Graphics Inc. has such a construction (Incidentally, OpenGL is a trademark of Silicon Graphics Inc.). However, the coordinate transformation information depends upon a type of drawing device. Because of this, if the coordinate transformation information is mixed with the drawing object information and the particular sequence of data is generated, the sequence of data cannot be used by a type of drawing device which cannot execute this sequence. Therefore, it is difficult to replace the drawing device. Moreover, in this case, there is a technique that the CPU carries out the so-called emulation on the sequence of data and converts it into executable sequence of data. However, since the emulation or conversion takes a long time, it is difficult to increase the speed of the image generating process.

In particular, the new type of drawing device is successively developed. If the current drawing device is replaced with the new type of drawing device, it is required to replace a device for generating the sequence of data for generating the 3D image. If the device for generating the sequence of data is an integrated device containing a function of generating the drawing object information, a function of generating the coordinate transformation information and a function of mixing these two kinds of information, it is required to replace all the functions, so that the replacement becomes on a large scale. Finally, the reconstruction of the whole of the apparatus is required. This prevents the apparatus from being efficiently or effectively generated by replacing only the drawing device. That is, the coordinate transformation that is the important element in the image generating process is operated as a state machine having a status therein. Hence, the function of the drawing device in this coordinate transformation can not cope with it only by replacing a single function, such as a library absorbing a typical device dependence.

SUMMARY OF THE INVENTION

It is therefore an object of the present invention to provide an image generating apparatus and an image generating method that can improve the speed of generating a image and that can easily replace a drawing device, and to provide a computer program to perform the image generating method.

The above object of the present invention can be achieved by an image generating apparatus for drawing a three-dimensional image, provided with: a drawing object information generating device for generating drawing object information, which is information for drawing objects as the three-dimensional image, in a single coordinate system; a coordinate transformation information generating device for generating coordinate transformation information, which is information for defining at least one of a view point and a field of view concerning the three-dimensional image; a drawing object information storing device for storing the drawing object information; a coordinate transformation information storing device for storing the coordinate transformation information, a drawing device for generate the three-dimensional image by using the stored drawing object information and the stored coordinate transformation information.

According to the image generating apparatus of the present invention, the information used to generate a three-dimensional image, that is, the coordinate transformation information and the drawing object information are separately generated by the independent devices, that is the coordinate transformation information generating device and the drawing object information generating device. Also, these two kinds of information are separately stored and managed by the independent devices, that is, the coordinate transformation information storing device and the drawing object information storing device. Then, the drawing device generates the three-dimensional image on the basis of the stored coordinate transformation information and the stored drawing object information.

Thus, the coordinate transformation information and the drawing object information are separately and independently prepared and the process of generating the three-dimensional image on the basis of these information is carried out all at once. Consequently, it is possible to improve a processing speed (i.e. a drawing speed) of generating the three-dimensional image. Furthermore, by separating the coordinate transformation information from the drawing object information, it becomes easy to replace the drawing device. Namely, by separating the coordinate transformation information and the drawing object information, it is possible to avoid the limitation of the conventional data structure that the substitution of a single function, such as a library absorbing a general device dependence, cannot handle the function of the drawing device in this coordinate transformation because the coordinate transformation, which is an important element for drawing, operates as a state machine having a condition inside. For example, by separating the coordinate transformation information from the drawing object information, the coordinate transformation information to be applied to a single display list can be restricted to one unit. That is, by separating the coordinate transformation information from the drawing object information, it is possible to configure such that the unit of the coordinate transformation information and the unit of the drawing object information (i.e. a single display list) correspond each other one to one, without the limitation of the configuration of the drawing device. Therefore, it is possible to remove the dependency on the drawing device.

Consequently, it is possible to improve the ability of replacement of the drawing device.

Incidentally, the drawing object information generating device may be constructed so as to generate the drawing object information in such a way that the drawing object information is divided into predetermined information units. For example, the predetermined information unit is defined on the basis of the unit of a display list. If the drawing object information is generated for each unit of the display list, the unit of the drawing object information matches the unit of the process of generating a three-dimensional image by applying the coordinate transformation information to the drawing object information in the drawing device. In addition, within the same predetermined information unit of the same display list or the like, the coordinate system is unified; however, it is not necessary to unify the coordinate system between the different predetermined information units.

In one aspect of the image generating apparatus of the present invention, the drawing object information storing device stores a plurality of units of the drawing object information generated by the drawing object information generating device, the coordinate transformation information storing device stores a plurality of units of the coordinate transformation information generated by the coordinate transformation information generating device, and the drawing device generates the three-dimensional image with an arbitrary combination of one or more than one of the plurality of units of the drawing object information and one or more than one of the plurality of units of the coordinate transformation information.

By constituting in this manner, it is possible to generate various three-dimensional images quickly according to use's requirements.

In another aspect of the image generating apparatus of the present invention, the drawing object information generating device comprises a list generating device for generating a list of the drawing object information.

According to this aspect, the drawing device generates the three-dimensional image by using the list of the drawing object information together with the coordinate transformation information. If the list is generated so as to match the so-called display list, it becomes easy to generate the three-dimensional image with the drawing device.

In another aspect of the image generating apparatus of the present invention, the image generating apparatus includes a drawing application processor and a graphics library. The graphics library is provided with: the drawing object information storing device; the coordinate transformation information storing device; and a controlling device for controlling the drawing device. The drawing application processor is provided with: the drawing object information generating device; the coordinate transformation information generating device; and an instructing device for instructing the controlling device to execute the generation of the three-dimensional image.

According to this aspect, both of the generating of the drawing object information and the generating of the coordinate transformation information are carried out in the drawing application processor (However, these two generating processes are separated in the drawing application processor.). Therefore, the graphics library and the drawing device can be separated from the drawing application processor. Consequently, it is possible to improve the ability of replacement. Moreover, since the single processor has the functions of generating the drawing object information and the coordinate transformation information and controls the graphics library and the drawing device, it becomes easy to generate the complex three-dimensional image. For example, the three-dimensional images drawn by changing the coordinate with respect to one drawing object can be easily generated by changing the coordinate transformation information while the drawing object information is fixed.

In another aspect on the image generating apparatus of the present invention, the drawing device is further provided with: a map information supplying device for supplying map information, which contains a source of the drawing object information, to the drawing object information generating device.

According to this aspect, a source of the drawing object information contained in the map information is supplied to the drawing object information generating device. Then, the drawing object information generating device generates the drawing object information on the basis of the source of the drawing object information contained in the map information. Moreover, for example, if the image generating apparatus is applied to a navigation system, position information of a movable body obtained from a GPS measurement apparatus or the like or route information inputted by the operator is used for the coordinate transformation. In this case, the coordinate transformation is carried out on the drawing object information by using the position information or route information. Thus, the three-dimensional image on the basis of map information can be generated. In addition, guidance information without the coordinate transformation can be displayed together with the three-dimensional image in the overlapping manner. By displaying of the images in an overlapping manner, an operator can easily understand the current position, a route to a destination or the like.

In another aspect of the image generating apparatus of the present invention, the image generating apparatus comprises a first portion and a second portion which are detachable each other, the drawing application device is put on the first portion, and the graphics library and the drawing device are put on the second portion.

According to this aspect, the graphics library and the drawing device can be separated from the drawing application processor. Therefore, replacement of the drawing device and graphics library becomes easy.

In another aspect of the image generating apparatus of the present invention, the drawing device generates the three-dimensional image with perspective.

According to this aspect, such a view that the operator can see from a driver's seat is displayed as the three-dimensional image in perspective, which allows the operator to easily recognize the image by corresponding it to the actual view.

In another aspect of the image generating apparatus of the present invention, the coordinate transformation information includes information for defining a light source.

According to this aspect, the drawing object information is transformed as the coordinate transformation information on the basis of light source information in addition to view point information and view field information, and it becomes possible to display the three-dimensional image more real. Moreover, even if the drawing device is replaced, the coordinate transformation information such as the view point information, the view field information and the light source information can be used as it is. Therefore, it is possible to replace the drawing device while keeping the quality of a three-dimensional image.

In another aspect of the image generating apparatus of the present invention, the information for defining the view point is set on the basis of a view point of a movable body operator.

According to this aspect, such a view that can be seen with the view point of the operator is displayed as the three-dimensional image, which allows the operator to easily recognize it as the image in three dimensions corresponding to the actual view. The view point may be set automatically or manually.

In another aspect of the image generating apparatus of the present invention, the information for defining the field of view is set on the basis of a field of view of a movable body operator.

According to this aspect, such a view in the field of view of the operator is displayed as the three-dimensional image. The field of view may be set automatically or manually.

In another aspect of the image generating apparatus of the present invention, the view point on the three-dimensional image is set so as to be located at a central portion of a display area of a display device.

According to this aspect, if the image generating apparatus is connected to a display device in order to display the generated three-dimensional image, the view point on the three-dimensional image is set so as to be located at the central portion of the display area of the display device. The drawing object is displayed after the coordinate transformation so as to set the view point of the operator at the central portion of the display area.

In another aspect of the image generating apparatus of the present invention, the drawing device generates a plurality of partial frame images on the basis of the stored drawing object information, and superimposes the plurality of partial frame images.

According to this aspect, the drawing device generates the three-dimensional image of one frame by superimposing the plurality of partial frame images generated on the basis of the plurality of pieces of the drawing object information. Therefore, a more real three-dimensional image can be generated by the drawing device quickly.

In another aspect of the image generating apparatus of the present invention, the image generating apparatus is further provided with a frame buffer for storing the plurality of partial frame images.

According to this aspect, since the plurality of partial frame images are stored in the frame buffer, the three-dimensional image of one frame can be generated by simply superimposing the plurality of partial frame image stored in the frame buffer. Therefore, it is possible to generate the three-dimensional image easily. In addition, the frame buffer may be installed in a buffer memory of the drawing device.

In another aspect of the image generating apparatus of the present invention, the coordinate transformation information generating device generates a plurality of units of the coordinate transformation information, in which at least one of the view point and the field of view is different from each other, with respect to one unit of the drawing object information, and the image processing device generates the three-dimensional image which changes with time by applying the plurality of units of the coordinate transformation information to the one unit of the drawing object information.

According to this aspect, when generating the three-dimensional image which changes as time elapses, the coordinate transformation information is changed in the state that the drawing object information is fixed. Therefore, the processing load for drawing can be reduced and the three-dimensional images, which sequentially change, can be quickly generated. For example, it is possible to generate the three-dimensional image that sequentially changes according to a traveling of a movable body by sequentially changing the view point of the coordinate transformation information with respect to the same drawing object information. Also, if information defining a light source is included in the coordinate transformation information, it is possible to generate the three-dimensional image that sequentially changes as time elapses by sequentially changing the light source of the coordinate transformation information.

In another aspect of the image generating apparatus of the present invention, a process of generating the drawing object information in the drawing object information generating device, a process of generating the coordinate transformation information in the coordinate transformation information generating device, a process of storing the drawing object information in the drawing object information storing device and a process of storing the coordinate transformation information in the coordinate transformation information storing device are carried out with multitasking.

According to this aspect, the drawing object information and the coordinate transformation information are generated and stored by multitasking, so that it becomes possible to generate the three-dimensional image more quickly as a whole.

In another aspect of the image generating apparatus of the present invention, the image generating apparatus is further provided with a display device for displaying the images generated by the drawing device.

According to this aspect, it is possible to realize various electronic equipment such as a navigation system, such as an on-vehicle navigation system capable of displaying the multiple-layer 3D image or the like; a game apparatus, such as an arcade game, a television game, or the like; a computer, such as a personal computer capable of displaying the multiple-layer 3D image or the like; and so on.

The above object of the present invention can be achieved by a program storage device readable by a computer for tangibly embodying a program of instructions executable by the computer to perform an image generating method of drawing a three-dimensional image. The image generating method is provided with: a drawing object information generating process of generating drawing object information, which is information for drawing objects as the three-dimensional image, in a single coordinate system; a coordinate transformation information generating process of generating coordinate transformation information, which is information for defining at least one of a view point and a field of view concerning the three-dimensional image; a drawing object information storing process of storing the drawing object information; a coordinate transformation information storing process of storing the coordinate transformation information; and a drawing process for generating the three-dimensional image by using the stored drawing object information and the stored coordinate transformation information.

According to the program storage device, the integrated control of the above described image generating apparatus of the present invention can be relatively easily realized as a computer reads and executes the program of instructions from the program storage device such as a CD-ROM (Compact Disc-Read Only Memory), a DVD-ROM (DVD Read Only Memory), a hard disc or the like, or as it executes the program of instructions after downloading the program through communication device.

The above object of the present invention can be achieved by a computer data signal embodied in a carrier wave and representing a series of instructions which cause a computer to perform an image generating method of drawing a three-dimensional image. The image generating method is provided with: a drawing object information generating process of generating drawing object information, which is information for drawing objects as the three-dimensional image, in a single coordinate system; a coordinate transformation information generating process of generating coordinate transformation information, which is information for defining at least one of a view point and a field of view concerning the three-dimensional image; a drawing object information storing process of storing the drawing object information; a coordinate transformation information storing process of storing the coordinate transformation information; and a drawing process for generating the three-dimensional image by using the stored drawing object information and the stored coordinate transformation information.

According to the computer data signal embodied in the carrier wave of the present invention, as the computer downloads the program in the computer data signal through a computer network or the like, and executes this program, it is possible to realize the integrated control of the above described image generating apparatus of the present invention.

The above object of the present invention can be achieved by an image generating method of drawing a three-dimensional image, provided with: a drawing object information generating process of generating drawing object information, which is information for drawing objects as the three-dimensional image, in a single coordinate system; a coordinate transformation information generating process of generating coordinate transformation information, which is information for defining at least one of a view point and a field of view concerning the three-dimensional image; a drawing object information storing process of storing the drawing object information; a coordinate transformation information storing process of storing the coordinate transformation information; and a drawing process for generating the three-dimensional image by using the stored drawing object information and the stored coordinate transformation information.

According to this aspect, the drawing object information and the coordinate transformation information concerning the objects to be drawn as the three-dimensional image are separately generated. Furthermore, the drawing object information and the coordinate transformation information are separately stored and managed. Then, the three-dimensional image is generated by using the drawing object information and the coordinate transformation information. Thus, the drawing object information and the coordinate transformation information are separately and independently prepared and the process of generating the three-dimensional image on the basis of these information is carried out all at once. Consequently, it is possible to improve a processing speed (i.e. a drawing speed) of generating of the images. Furthermore, by separating the coordinate transformation information from the drawing object information, it becomes easy to replace the drawing device.

In one aspect of the image generating method of the present invention, the drawing object information generating process comprises a list generating process of generating a list of the drawing object information.

According to this aspect, in the drawing process, the three-dimensional image is generated by using the list of the drawing object information together with the coordinate transformation information. If the list is generated so as to match the so-called display list, it becomes easy to generate the three-dimensional image with the drawing device.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENT

The preferred embodiments according to an image generating apparatus and an image generating method and a computer program in the present invention will be explained below with reference to the drawings. By the way, the respective embodiments described below are established as the apparatus in which the image generating apparatus of the present invention is used as a navigation system for a car. However, they are not limited to it. The present invention can be preferably applied to an image generation using a personal computer, an image generation for a television game and the like.

(First Embodiment)

Figure 3:
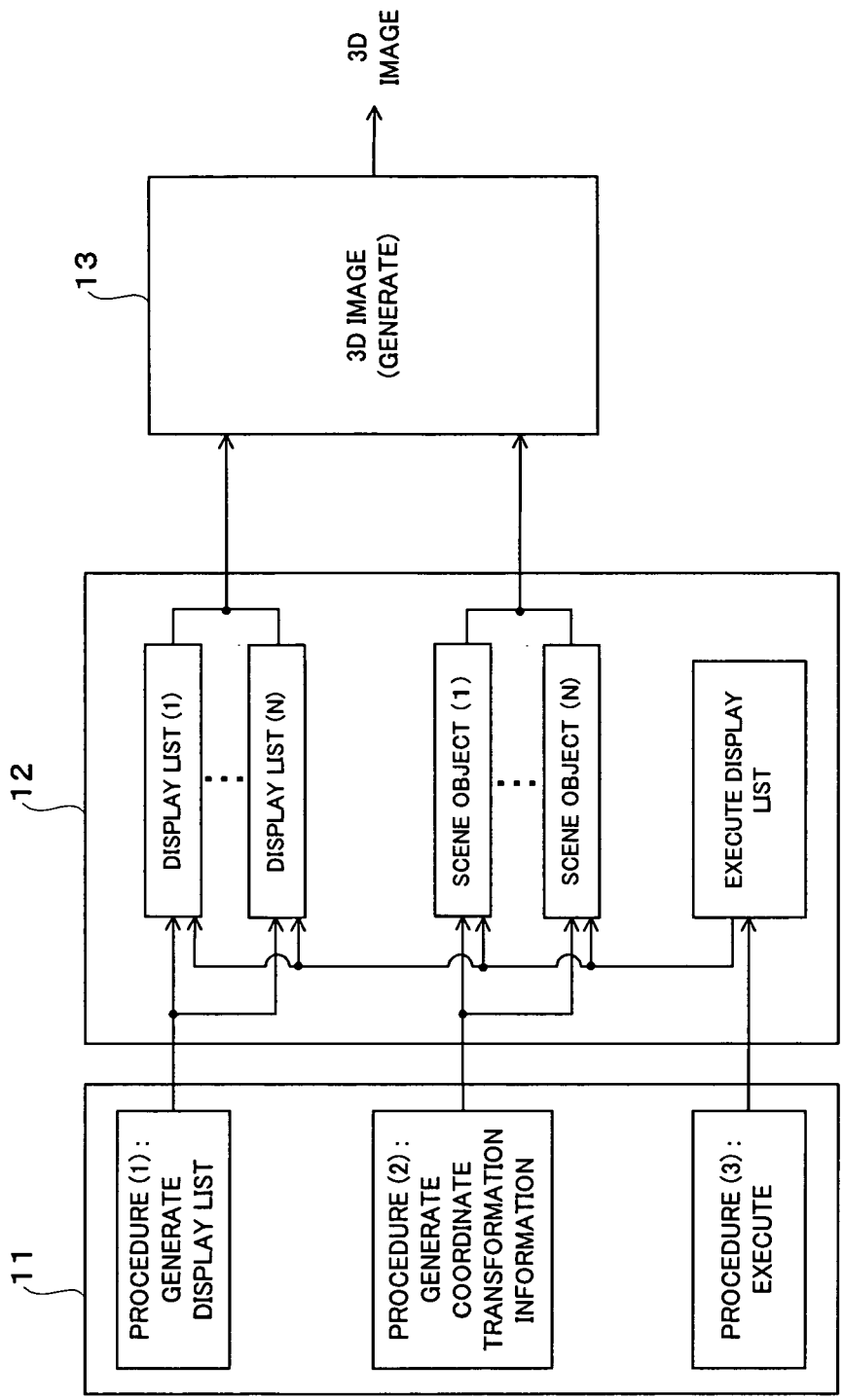
FIG. 3 is a view illustrating a management of a scene object of an image generating apparatus.
Figure 4:
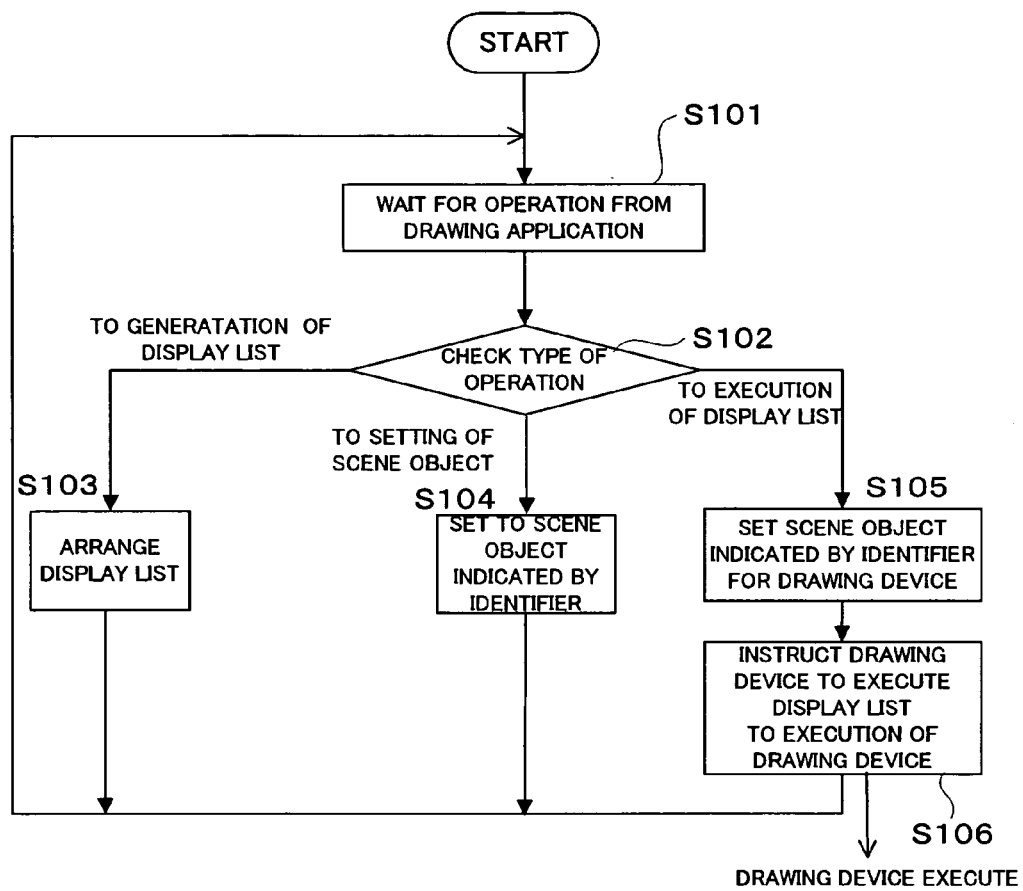
FIG. 4 is a flowchart showing a flow of an operation of a graphics library.
Figure 5:
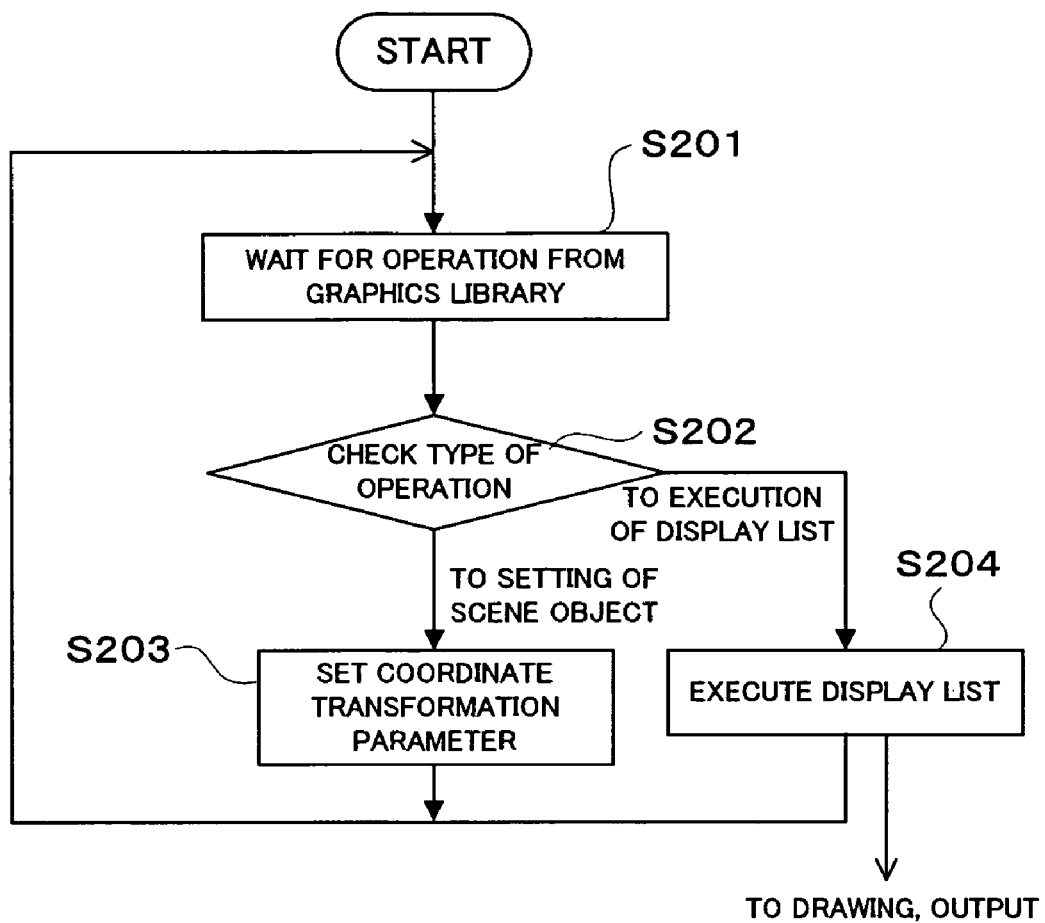
FIG. 5 is a flowchart showing a flow of an operation of a drawing device of an image generating apparatus.
Figure 6:
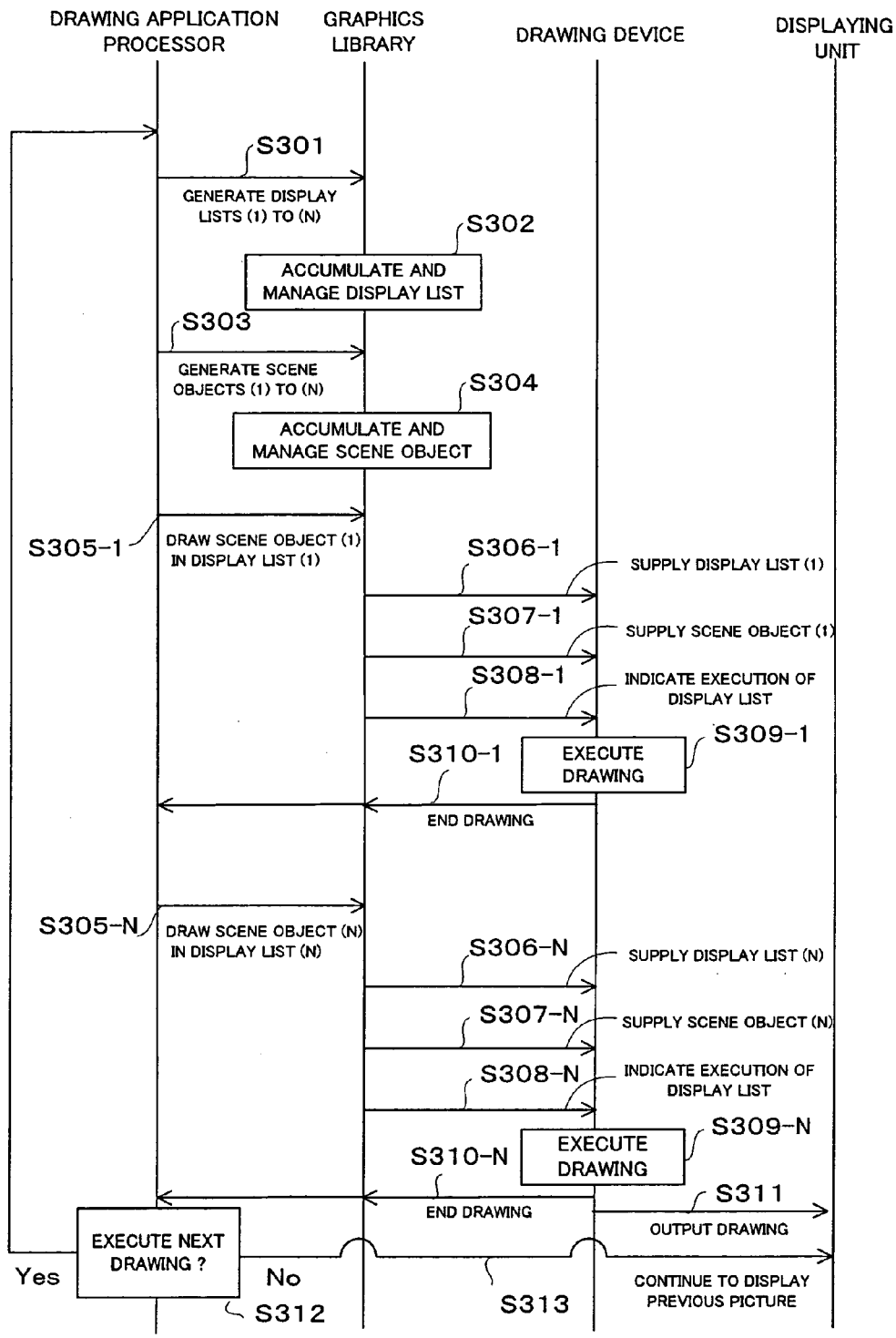
FIG. 6 is a sequence chart showing an operation of an image generating apparatus.
Figure 7:
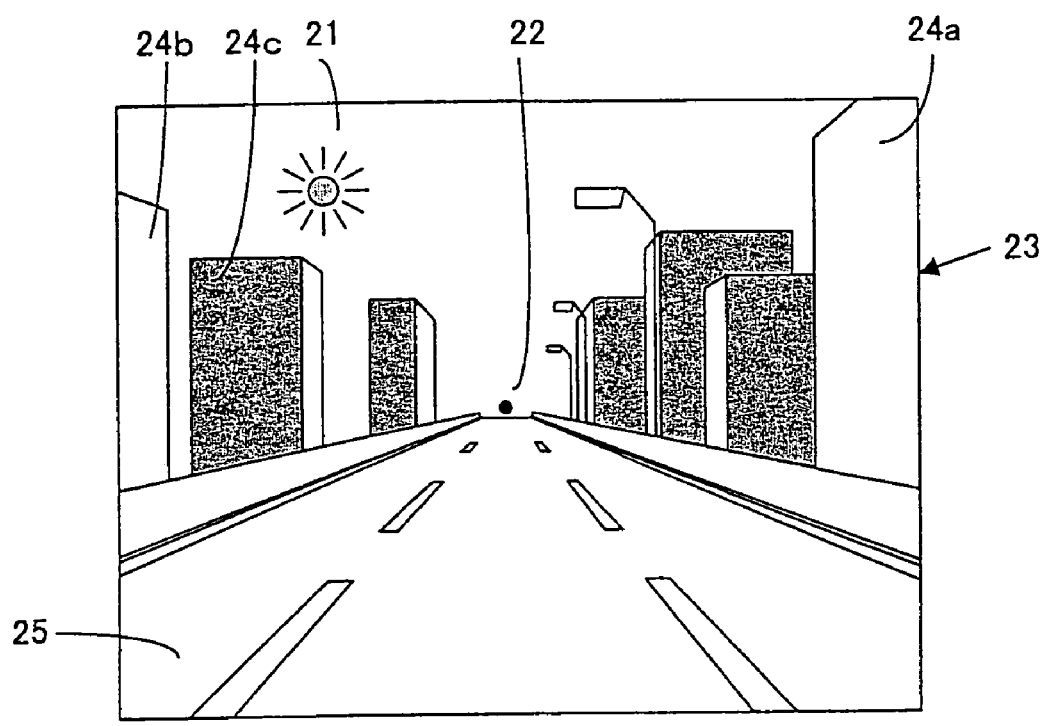
FIG. 7 is a view showing an example of a drawing.

An image generating apparatus in the first embodiment will be described below with reference to FIG. 1 to FIG. 8. Here, FIG. 1 is a block diagram showing a basic configuration of an image generating apparatus, which is a first embodiment of the present invention, FIG. 2 is a view illustrating an inner configuration of a graphics library constituting the image generating apparatus and the ability of replacement, FIG. 3 is a view illustrating a management of a scene object with regard to an image generating process, FIG. 4 is a flowchart showing a flow of an operation of a graphics library constituting the image generating apparatus, FIG. 5 is a flowchart showing a flow of an operation of a drawing device constituting the image generating apparatus, FIG. 6 is a sequence chart showing an operation of the image generating apparatus in this embodiment, and FIG. 7 is a view showing an example of a drawing.

At first, the basic configuration of the image generating apparatus in this embodiment is described with reference to FIG. 1.

Figure 1:
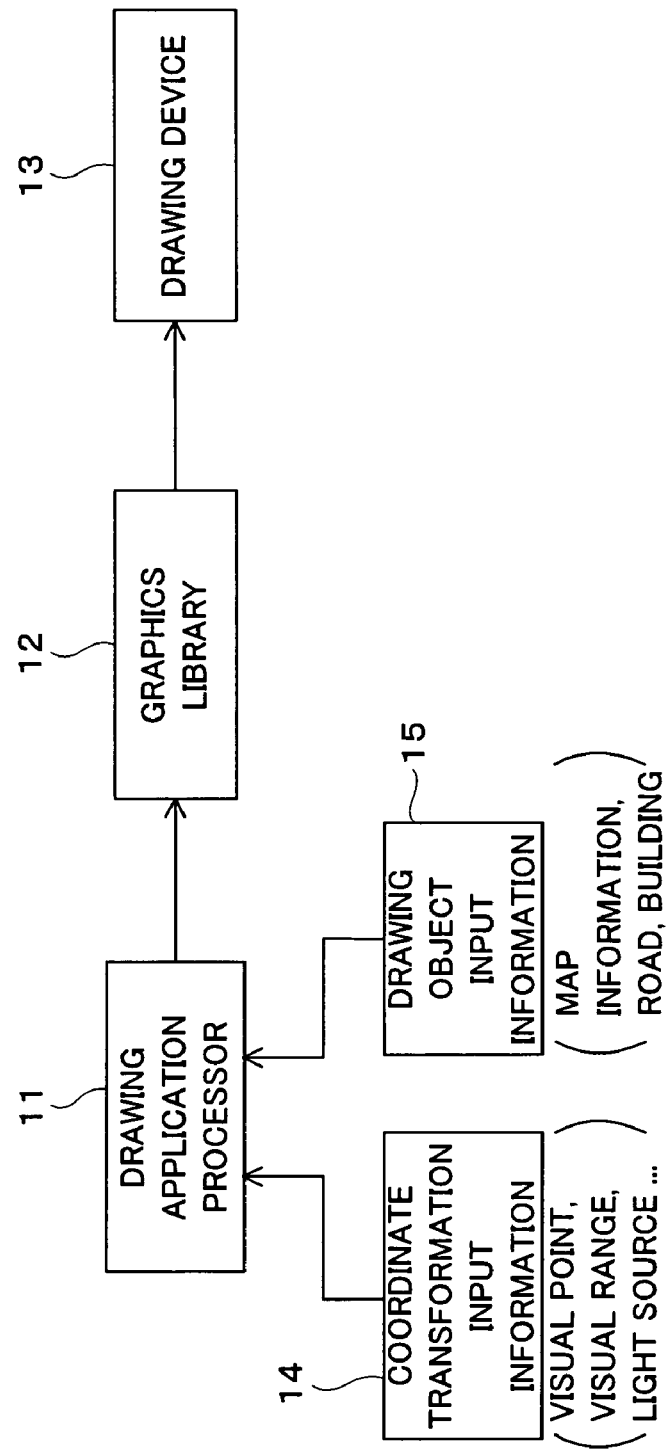
FIG. 1 is a block diagram showing a basic configuration of an image generating apparatus, which is a first embodiment of the present invention.

In FIG. 1, the image generating apparatus 1 is provided with a drawing application processor 11, a graphics library 12 and a drawing device 13. Coordinate transformation input information 14 and drawing object input information 15 are inputted to the drawing application processor 11. The coordinate transformation input information 14 is used as sources of the coordinate transformation information. The coordinate transformation information includes information for defining a view point, a field of view, a lightsource and the like. The drawing object input information 15 is used as sources of the drawing object information. The drawing object information includes information of a road, a building, a map and the like. The graphics library 12 and the drawing device 13 constitute a system integrally with each other, and arbitrarily replaced for the drawing application processor 11, as described below. This contributes improvement of the ability of replacement.

Figure 2:
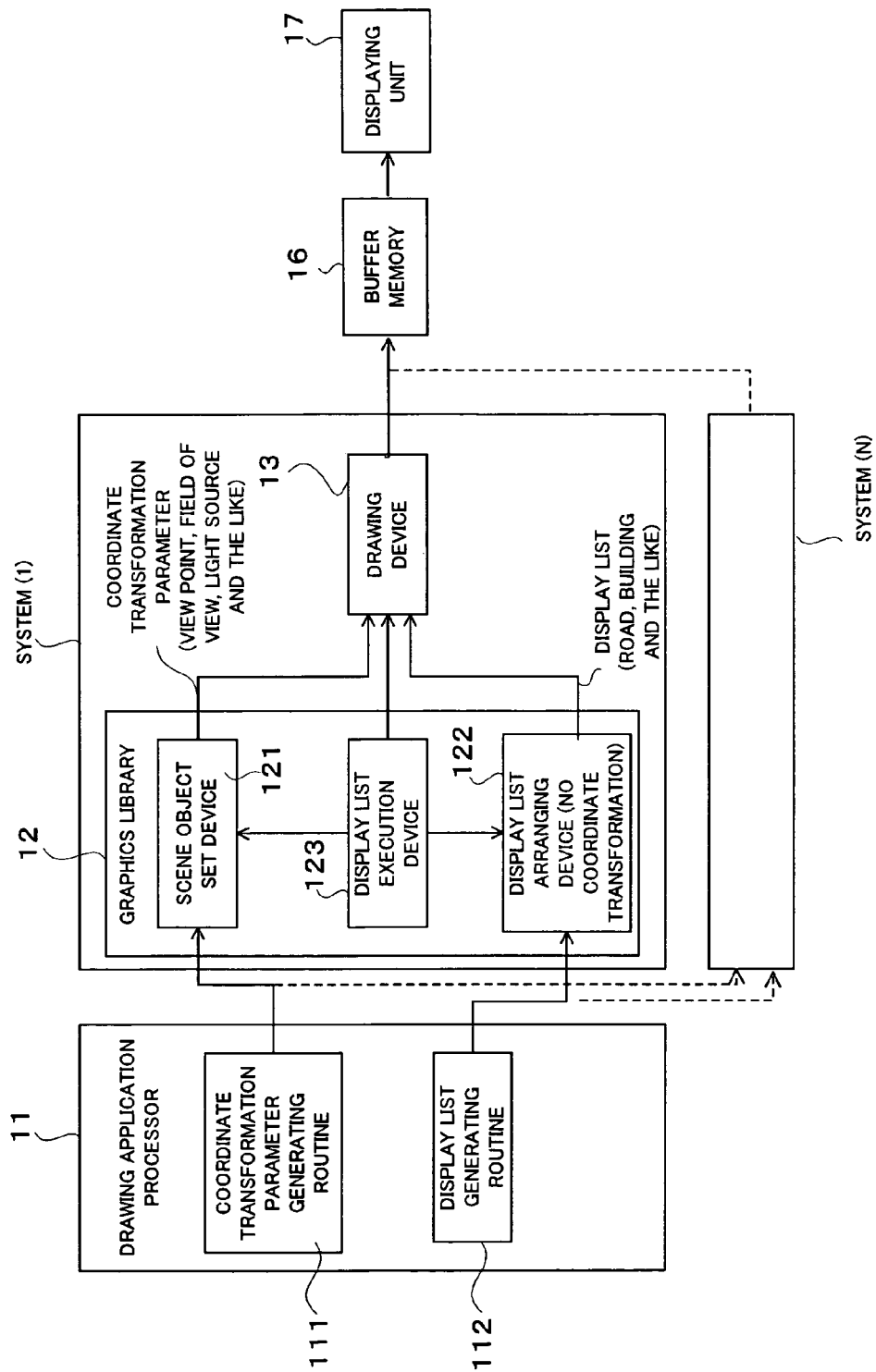
FIG. 2 is a view illustrating an inner configuration of a graphics library of an image generating apparatus and the ability of replacement of a drawing application.

As shown in FIG. 2, the drawing application processor 11 has a coordinate transformation parameter generating routine 111 and a display list generating routine 112. The coordinate transformation parameter generating routine 111 generates the coordinate transformation information (a coordinate transformation parameters) containing the information of a view point, a field of view, a light source and the like on the basis of the coordinate transformation input information 14. The coordinate transformation information (the coordinate transformation parameters) is managed as a scene object by the graphics library 12. Moreover, an identifier is set on the scene object. The operations for setting the coordinate transformation parameters for the scene object and applying the set coordinate transformation parameters to the drawing process are executed by identifying the identifier.

The display list generating routine 112 generates the drawing object information containing the information of a road, a building, a map and the like on the basis of the drawing object input information 15. Then, the display list generating routine 112 generates a display list by using the drawing object information. Then, the display list generating routine 112 supplies the display list to the graphics library 12. The drawing object information does not include the coordinate transformation information or the coordinate transformation parameters. Also, the display list does not include the coordinate transformation information or the coordinate transformation parameters. The coordinate transformation information (the coordinate transformation parameters) is separately generated and set as the scene object. In this way, the drawing object information (the display list) and the coordinate transformation information (the coordinate transformation parameters) are separately and independently generated and managed, and the 3D image is generated by applying the coordinate transformation information to the drawing object information at the time of the execution of the image generating process. This attains the replacement of the system as mentioned above and the higher speed of the drawing speed.

Next, the graphics library 12 has a scene object setting device 121, a display list arranging device 122 and a display list execution device 123.

The scene object setting device 121 stores the coordinate transformation information (the coordinate transformation parameters) generated by the coordinate transformation parameter generating routine 111 of the drawing application processor 11, and manages it. The coordinate transformation information (the coordinate transformation parameters) is stored in the scene object corresponding to the identifier set by the drawing application processor 11. The display list arranging device 122 arranges or reconstructs the display list generated by the display list generating routine 112 of the drawing application processor 11. In the display list arranging device 122, the display list is arranged or reconstructed so as to be suitable for the drawing device 13. Thus, the drawing device 13 can directly execute the image generating process at a time by using the arranged or reconstructed display list. Therefore, the speed of the image generating process can be increased.

The display list execution device 123 controls the drawing device 13. When generating the 3D image, the display list execution device 123 instructs the scene object setting device 121 and the display list arranging device 122 to send the coordinate transformation information and the arrange or reconstructed display list to the drawing device 13, and further instructs the drawing device 13 to execute the image generating process.

In this graphics library 12, the coordinate transformation information (the coordinate transformation parameters) and the drawing object information (display list) are separated and stored. Then, at the time of the image generating process, the drawing device 13 applies the coordinate transformation information to the drawing object information, and carries out the coordinate transformation by adding the conditions of the view point, the field of view, the light source and the like, which are set as the scene object, and generates the 3D images. The drawing object information included in a single display list is formed on a single coordinate system that does not depend on the view point and the field of view.

The image generated by the drawing device 13 is held in a buffer memory 16 and supplied to the display unit 17. Thus, the image is displayed by the display unit 17.

Here, in the image generating apparatus 1, the coordinate transformation information and the drawing object information are separately generated, separately stored and separately managed. This makes it possible to construct the graphics library 12 and the drawing device 13 as the system (1) independent of the drawing application processor 11. Therefore, the system (1) can be replaced with another system (N) including another graphics library and another drawing device. Consequently, the selection branch spreads in the fields of the design, the generation, the manufacture and the maintenance of the apparatus and the like. Hence, the serviceableness is vast.

Moreover, many scene objects whose identifiers are different from each other may be stored, or many display lists whose drawing objects are different from each other may be stored. By carrying out the image generating process through a mobile combination of many scene objects and display lists, it is possible to provide the effect that various pictures having different coordinate systems can be generated at a high speed. For example, the 3D image which is continuously changed can be relatively easily generated by changing only the coordinate transformation information (namely, for example, changing only the view point and the field of view or only the light source) while fixing the display list in relation to the object of the drawing target.

In addition, although FIG. 2 shows one buffer memory 16 for the explanatory convenience, a plurality of buffer memories for transiently storing a plurality of partial frame images to be generated on the basis of a plurality of drawing object information which are generated and stored for each object, respectively, may be provided. It is also possible to output as a 3D image of one frame by overlapping the plurality of partial frame images through a drawing device 13. Moreover, it is possible to carry out the overlapping process through the drawing device 13 while using a Z-buffer for removing the rear portions of the overlapped images.

In particular, the configuration in which the many scene objects and the many display lists can be simultaneously treated by the drawing application processor 11 and the graphics library 12 is advantageous in making the speed of the drawing process higher through a multi-task faster.

The procedure for generating the 3D image will be described below with reference to FIG. 3. At first, the drawing application processor 11 generates a display list (Procedure (1)). The generated display list is stored as an object display list (1) of the graphics library 12. Next, the drawing application processor 11 generates coordinate transformation information (coordinate transformation parameters) (Procedure (2)). The coordinate transformation information (the coordinate transformation parameters) is stored in a scene object (1). At this time, an identifier is set on the scene object (1). Next, the drawing application processor 11 instructs the graphics library 12 to execute the image generating process (Procedure (3)). In response to this, the graphics library 12 accesses the display list (1) and the scene object (1), sends the drawing object information of the display list (1) and the coordinate transformation information of the scene object (1) to the drawing device 13, and instructs the drawing device 13 to execute the image generating process. In response to this, the drawing device 13 executes the image generating process, thereby generating the 3D image.

The drawing device 13 has the coordinate transformation function. On the basis of the coordinate transformation parameters indicated by the identifier, for example, on the basis of a view point and a field of view of a driver, a light source, and the like if a car is driving, a drawing object information, for example, a current view during the driving that is watched by the driver is generated and displayed in the 3D image. At this time, many object display lists or scene objects can be generated and stored in advance, and any one of or some display lists and any one of or some scene objects can be combined.

The flow of the operation of the graphics library 12 will be described below with reference to FIG. 4.

At first, from a waiting state for an operation input from the drawing application processor 11 (Step S101), if there is the operation input, a type of the operation is checked (Step S102). The types of the operation in the graphics library 12 are the arranging or reconstructing of the display list, the setting of the scene object and the execution of the display list.

If the arranging or reconstructing of the display list is indicated, the display list received from the drawing application processor 11 is arranged or reconstructed so as to be suitable for the drawing device 13 (Step S103). After the arranging or reconstructing of the display list, the operational flow returns back to the step S101, and waits for a next operation input.

As the checked result at the step S102, if the operation input is the setting of the scene object, the coordinate transformation information received from the drawing application processor 11 is set to the scene object indicated by the identifier (Step S104). When the setting of the scene object is completed, the operational flow again returns back to the step S101 and waits for a next operation input.

As the checked result at the step S102, if the operation input is the execution of the display list, the scene object indicated by the identifier is set for the drawing device 13 (Step S105). Then, the graphics library 12 instructs the drawing device 13 to execute the display list (i.e. to execute the image generating process) (Step S106).

After that, the operational flow returns back to the step S101 and waits for a next operation input. The drawing device 13 executes the display lists at a time, and generates the image. The executing procedure is based on the executing procedures described with reference to FIG. 3.

The flow of the operation of the drawing device 13 will be described below with reference to FIG. 5.

At first, from a waiting state for an operation input from the graphics library 12 (Step S201), if there is the operation input, a type of the operation is checked (Step S202). As the types of the operation, there are the setting of the scene object and the execution of the display list.

If the setting of the scene object is indicated, the drawing device 13 sets the coordinate transformation parameters corresponding to the scene object indicated by the identifier (Step S203). After the completion of the setting of the coordinate transformation parameters, the operational flow again returns back to the step S201 and waits for a next operation input.

As the checked result at the step S202, if the operation input is the execution of the display list, the image generating process is executed on the basis of the coordinate transformation parameters and the display list. The generated image is outputted from the drawing device 13.

The operation of the image generating apparatus will be described below along the temporal flow with reference to a sequence chart of FIG. 6. This sequence chart temporally shows the mutual relation between the drawing application processor 11, the graphics library 12, the drawing device 13 and the display unit 17. The lateral line represents the mutual relation, and the longitudinal line represents the temporal elapse from the top to the bottom.

At first, the drawing application processor 11 generates a display list, and sends it to the graphics library 12 (Step S301). The graphics library 12 arranges or reconstructs the display list and fits it to the drawing device 13. Then, the graphics library 12 stores and manages the arranged or reconstructed display list (Step S302).

Next, the drawing application processor 11 generates coordinate transformation parameters and sets an identifier. Then, the drawing application processor 11 instructs the graphics library 12 to set the coordinate transformation parameters to a scene object corresponding to the identifier (Step S303). In response to this instruction, the graphics library 12 sets the coordinate transformation parameters. Then, the graphics library 12 stores and manages it (Step S304).

The display list and the scene object may be generated whenever one image generation process is carried out. Alternatively, a plurality of display lists (1)–(N) and a plurality of scene objects (1)–(N) may be generated in advance and stored.

Next, the drawing application processor 11 instructs the graphics library 12 to generate the 3D image by combining the display list (1) and the scene object (1) (Step S305-1). In response to this instruction, the graphics library 12 supplies the display list (1) (Step S306-1) to the drawing device 13, and further supplies the scene object (1) to the drawing device 13 (Step S307-1). After that, the graphics library 12 instructs the drawing device 13 to execute the display list (Step S308-1).

In response to this instruction, the drawing device 13 executes the display list on the basis of the coordinate transformation parameters of the scene object, and generates the image (Step S309-1). When the image generating process on the display list (1) is ended, the drawing device 13 reports the completion of the image generating process on the display list (1) to the graphics library 12 and the drawing application processor 11 (Step S310-1).

Next, the similar processes are repeatedly carried out on the display list (i) and the coordinate transformation information (i) (i=1, 2, 3, . . . ). Finally, the drawing application processor 11 instructs the graphics library 12 to generate the 3D image by combining the display list (N) and the scene object (N) (Step S 305-N). In response to this instruction, the graphics library 12 supplies the display list (N) to the drawing device 13 (Step 306-N), and further supplied the scene object (N) to the drawing device 13 (Step S307-N). After that, the graphics library 12 instructs the drawing device to execute the image generating process (Step S308-N). In response to this instruction, the drawing device 13 executes the display list on the basis of the coordinate transformation parameters of the scene object, and generates the image (Step S309-N). When the image generating process on the display list (N) is ended, the drawing device 13 reports the completion of the image generating process on the display list (N) to the graphics library 12 and the drawing application processor 11 (Step S310-N).

Then, the process for ending the image generating process is carried out. Moreover, at this time, the drawing device supplies the generated image to the display unit 17 (Step S311). Thus, the image is displayed.

When the drawing application processor 11 receives the report of the completion of the image generating process, the drawing application processor 11 determines whether or not the next image generating process is carried out (Step S312). If the next image generating process is carried out, the above-mentioned processes are carried out from Step S301 again. On the other hand, if the next image generating process is not carried out, the drawing application processor 11 determines whether to continue the displaying of the current image (Step S313) or erase the image, according to the various conditions.

FIG. 7 is an example of the displaying of the 3D images generated as mentioned above. FIG. 7 shows a view on the basis of the view point of a driver when a car is driving on a road in a town. In FIG. 7, a light source 21, a view point 22, a field of view 23 and the like relate to the coordinate transformation information represented by the identifier set in the scene object. Buildings 24a, 24b, 24c, . . . and a road 25 and the like correspond to the drawing object information. For example, the light source 21 is the sun in the daytime, and it is a streetlight in the night. Their positions and the illumination directions are the parameters. Also, is the view point is set on the basis of the view point of a driver, the driver can be watched at the feeling similar to that of the view of the environment in which the car is driving. The field of view 23 defines a predetermined image range. This range is set so as to be suitable for the driver.

Also, the buildings 24a, 24b, 24c, . . . and the road 25 and the like correspond to the drawing object information. The display list in relation to them is generated in the format that can be directly executed by the drawing device. The drawing object information can be used from those supplied through a map information database of the navigation system and the like. Also, the format as the drawing object information is represented in the single coordinate system that does not contain the coordinate transformation information.

In FIG. 7, in accordance with the information of the scene object, the light source 21, namely, the sun is forwardly located, and therefore, the side of the buildings 24a, 24b, 24c, . . . that faces the driver is darkly shaded. Also, the view point 22 is located over the road 25. Then, the coordinate transformation is done such that the drawing objects, such as the buildings 24a, 24b, 24c, . . . and the road 25 and the like which are within the range set by the field of view 23, are converged to this view point 22, by using the method based on the perspective.

As mentioned above, since the drawing object information and the coordinate transformation information are treated while separated from each other, the image generating process can be done by carrying out the coordinate transformation of the image at a high speed. By changing the coordinate transformation information, the generating an image at a different coordinate can be easily done for the same drawing object. Also, the separation between the drawing object information and the coordinate transformation information enables the drawing device to be selected or replaced.

(Second Embodiment)

The above-mentioned image generating apparatus will be described below by exemplifying the case when this apparatus is applied to a navigation system for a mobile body. The various functions of the navigation system are closely related to the image generating apparatus. Therefore, the image generating apparatus are installed in the navigation system integrally. This point is described in detail. Incidentally, the configuration and the operations of the image generating apparatus itself are similar to those as mentioned above. Then, the re-explanation is omitted. The above-mentioned explanation is suitably seen as necessary.

Figure 8:
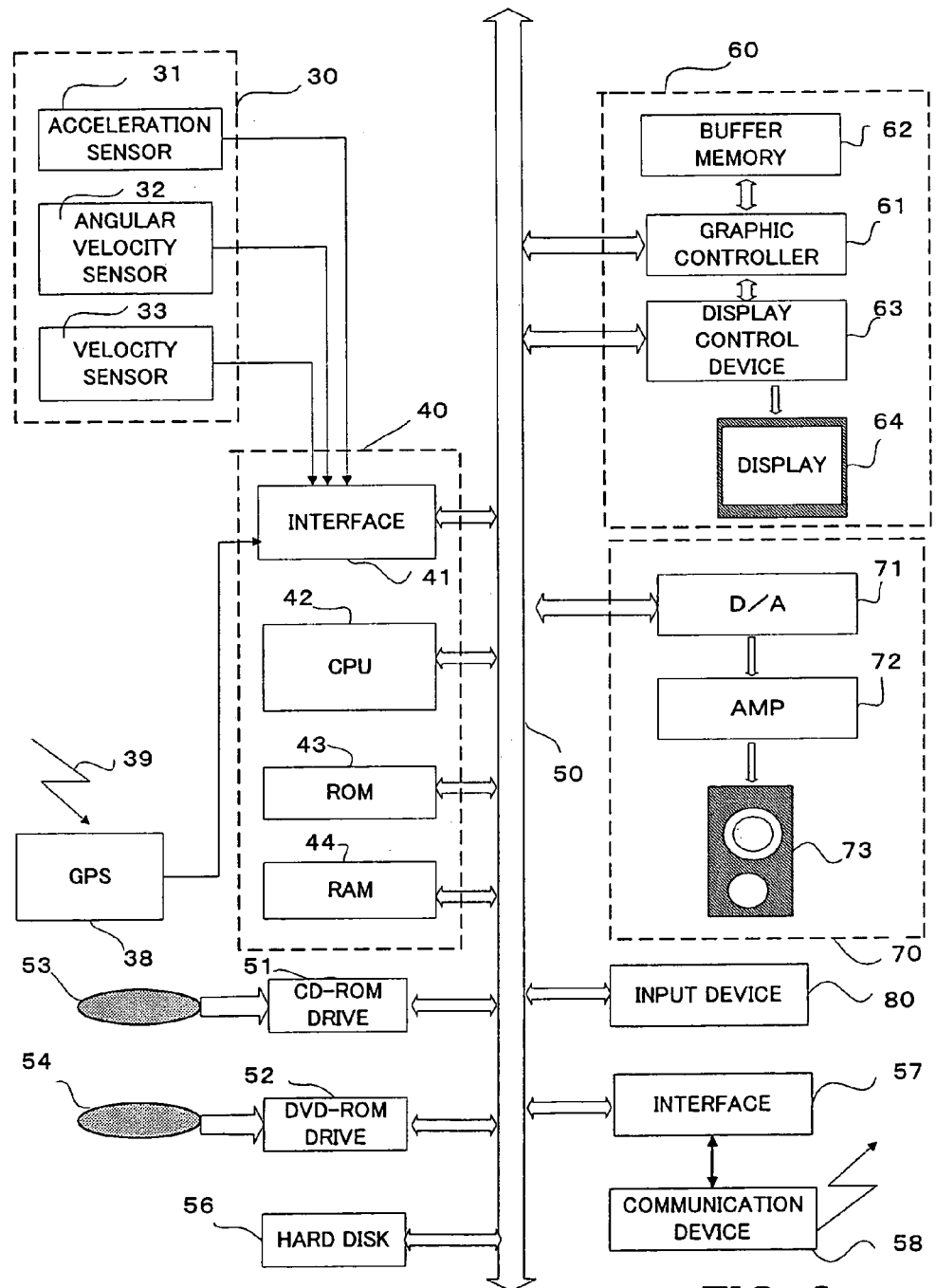
FIG. 8 is a view showing a configuration of a navigation system applied to an image generating apparatus of the present invention as a second embodiment.

At first, the navigation system of this embodiment is schematically described with reference to FIG. 8.

The navigation system is provided with a self-contained positioning apparatus 30, a GPS receiver 38, a system controller 40, an input/output (I/O) interface circuit 41, a CD-ROM drive 51, a DVD-ROM drive 52, a hard disk device (HDD) 56, a wireless communication device 58, a display unit 60, an audio output unit 70, an input device 80 and an external interface (I/F) device (not shown). The respective devices are connected to a bus line 50 for a control data transfer and a process data transfer.

The self-contained positioning apparatus 30 is constructed to include an acceleration sensor 31, an angular velocity sensor 32, and a velocity sensor 33. The acceleration sensor 31, which is constructed by a piezoelectric element, for example, detects an acceleration of a vehicle and outputs acceleration data. The angular velocity sensor 32, which is constructed by a vibration gyro, for example, detects an angular velocity of a vehicle when the vehicle changes its moving direction and outputs angular velocity data and relative azimuth data. The velocity sensor 33 detects a rotation of a vehicle shaft, mechanically, magnetically or optically, and outputs a signal of a pulse number corresponding to a car speed at every rotation for a predetermined angle around the vehicle shaft.

The GPS receiver 38 has the known configuration in which it has a plane polarization non-directional reception antenna, a high frequency reception processor, a digital signal processor (DSP) or a micro processor unit (MPU), a V-RAM, a memory and the like. The GPS receiver 38 receives the electric waves from at least three GPS satellites placed into orbit around the earth, and carries out a spectral back-diffusion, a distance measurement, a Doppler measurement, an orbit data process, and carries out a position calculation and a movement speed azimuth calculation, and continuously outputs an absolute position information of a reception point (a car driving point) from the I/O circuit 41 to the bus line 50, and the system controller 40 captures it, and carries out a screen display on a map road.

The system controller 40 is composed of a CPU (Central Processing Unit) 42, a ROM (Read Only Memory) 43 that is a non-volatile solid memory device, and a working RAM 44, and it sends and receives a data to and from the respective units connected to the bus line 50. The process control for sending and receiving this data is executed by a boot program and a control program stored in the ROM 43. In particular, the RAM 44 transiently stores the setting information to change a map display (change to an entire or district map display) through a user operation from the input device 80 and the like.

The CD-ROM drive 51 and the DVD-ROM drive 52 read out, from a CD-ROM 53 and a DVD-ROM 54, the map database information (for example, the various road data such as the number of lanes, a road width and the like in the map information (drawings) respectively stored therein, and output them.

The hard disk device 56 can store the map (image) data read by the CD-ROM drive 51 or the DVD-ROM drive 52 and then read out it at any time after it is stored. The hard disk device 56 can further store a voice data and an image data read from the CD-ROM drive 51 or the DVD-ROM drive 52. Consequently, for example, it is possible to read out the map data on the CD-ROM 53 and the DVD-ROM 54, and carry out the navigation operation, and meanwhile read out the voice data and the image data stored in the hard disk device 56 and then carry out a voice output and an image output. Or, it is possible to read out the voice data and the image data on the CD-ROM 53 and the DVD-ROM 54, and carry out the voice output and the image output, and meanwhile read out the map data stored in the hard disk device 56 and then carry out the navigation operation.

The display unit 60 displays the various process data on the screen under the control of the system controller 40. The display unit 60 controls the respective portions of the display unit 60 in accordance with the control data transferred from the CPU 42 through the bus line 50. Also, it transiently stores an image information that can be instantly displayed by a buffer memory 62 using V-RAM. Moreover, a display controller 63 carries out a display control, and displays an image data outputted from a graphic controller 61 on a display 64. This display 64 is placed near a front panel in the car.

In the audio output unit 70, a D/A converter 71 converts the voice signal transferred through the bus line 50 under the control of the system controller 40, into a digital signal. At the same time, a voice analog signal outputted from the D/A converter 71 is variably amplified by a variable amplifier (AMP) 72, outputted to a speaker 73, and outputted as a voice from it.

The input device 80 is composed of keys, switches, buttons, a remote controller, a voice input unit and the like to enter the various commands and the data. The input device 80 is placed around the display 64 and a front panel of a main body of the car electronic system installed in the car.

Here, in the navigation system, it is required to suitably display the image coincident with a drive route. That is, the image watched from the driver's view point on the road on which the driver is currently driving is desired to be displayed in the 3D image. Also, from the viewpoint of safety, it is useful to display, in the 3D image, the image when the car turns at a forward crossing and the view ahead of an unclear location, and also report its fact to the driver. Moreover, various messages need to be superimposed on the image and displayed. Such requirements of the navigation system are also the requirements of the image generating apparatus installed in the navigation system, and the image generating apparatus can satisfy these requirements, as mentioned above.

Thus, by installing the above-mentioned image generating apparatus in the navigation system and designating the navigation system so as to cooperate the image generating apparatus with the various devices of the navigation system, the extremely effective navigation system can be attained.

The cooperating operation of the image generating apparatus and the various devices of the navigation system will be described below.

As mentioned above, in the image generating apparatus, the drawing application processor 11 separately generates the coordinate transformation information of the view point, the field of view, the light source and the like and the drawing object information of the road, the building and the like. Then, the graphics library 12 separately stores and manages these two kinds of information. Then, the drawing device 13 actually generates the images by using these information.

As the drawing object information, the map information containing information of a road and a building is used. The map information is obtained from the map database of the navigation system. More concretely, the map information is stored in the CD-ROM 53 and the DVD-ROM 54 and read out through the CD-ROM drive 51 and the DVD-ROM drive 52. Also, the map information can be obtained through the communicating unit 58 from a predetermined site and stored in the hard disk device 56 to thereby use it. Also, after the map information of the drive route read out through the CD-ROM drive 51 or the DVD-ROM drive 52 is stored, it can be read out at any time. This work may be carried out when a drive plan is prepared.

The map information is divided into many regions. The divided map information included in the respective regions are represented by the various coordinate systems. Namely, in respective regions, the coordinate systems are not the same. The display list generating routine 112 of the drawing application processor 11 in the image generating apparatus converts the map information into drawing object information of a single coordinate system, which does not depend on the position of a view point and a field of view, and generates a display list on the basis of the drawing object information.

Then, the drawing application processor 11 instructs the graphics library 12. In response to this instruction, the display list arranging device 122 of the graphics library 12 arranges or reconstructs the display list so as to be suitable for the drawing device 13. Then, the display list arranging device 122 stores and manages the arranged or reconstructed display list.

On the other hand, information of the view point, the field of view, the light source and the like which are used as the sources of the coordinate transformation information can be obtained in the following manner. Namely, in order to determine the view point, the field of view, the light source and the like, at first, it is necessary to know a current position of the car during the driving. This current position is measured by the GPS receiver 38 or the self-contained positioning apparatus 30 of the navigation system. Then, the location on the map information corresponding to the measured current position is determined by comparing the map information with the measured current position. Thus, the traveling direction of the car and the proper view point and field of view are determined. Incidentally, the view point and the field of view may be determined at a predetermined position or range. Moreover, these point and field may be set manually.

If the traveling direction of the car and the current time are known, the direction of the sun can be determined by considering the seasonal factor. On the basis of this, the location of the light source is determined. Also, if a view of an arrival location after a predetermined time is desired to be watched, the direction of the sun can be determined by similarly setting the position and the arrival time. Thus, it is possible to watch the image in which the effect of the position of the light source at the arrival time is reflected.

Also, the change in the shade and shadow of a view from a sunrise to a sundown can be displayed by applying the coordinate transformation information concerning the light source to the drawing object information while changing the coordinate transformation information according to the momentarily changing time. Moreover, the change of the location or the form of the 3D image can be sequentially displayed by sequentially changing the coordinate transformation information of the view point, the field of view or the like. In particular, if the change of 3D image corresponding to the change of the view when the car is continuously driving on the same road is displayed, the coordinate transformation information is changed in association with the driving while the drawing object information is fixed. Thus, the continuous change of the 3D image can be displayed efficiently.

As mentioned above, the function of the navigation system can be used to determine the scene object serving as the coordinate transformation information, and the map information can be used to determine the drawing object information. Thus, the 3D image can be generated on the basis of the coordinate transformation information and the drawing object information independently of each other. The image is introduced into the display unit 60 of the navigation system, and accumulated in the buffer memory 62 using the V-RAM and the like by the graphic controller 61, and read out from it, and then displayed on the display 64 through the display controller 63.

As mentioned above, the image generating apparatus of the present invention has been described by exemplifying the case of the application to the navigation system. However, it is not limited to this case. Preferably, it may be used for the image generation in a personal computer, a work station, a mobile, a portable telephone and the like, the image generation in a television game, an arcade game, a portable game and the like, and the image generation in a handling simulation apparatus or a training apparatus for various mobile bodies such as a car, a motorcycle, an airplane, a helicopter, a rocket, a ship and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2001-295140 filed on Sep. 26, 2001 including the specification, claims, drawings and summary is incorporated herein by reference in its entirety.

What is claimed is:

1. An image generating apparatus for drawing a three-dimensional image comprising:
   a drawing object information generating device for generating drawing object information, which is information for drawing objects as the three-dimensional image, in a single coordinate system;
   a coordinate transformation information generating device for generating coordinate transformation information, which is information for defining a view point, a field of view, or both of the view point and the field of view concerning the three-dimensional image, separately and independently from the drawing object information;
   a drawing object information storing device for storing the drawing object information, separately and independently from the coordinate transformation information;
   a coordinate transformation information storing device for storing the coordinate transformation information, separately and independently from the drawing object information; and
   a drawing device for generating the three-dimensional image by using the drawing object information that is directly input from said drawing object information storing device to said drawing device and the coordinate transformation information that is directly input from said coordinate transformation information storing device to said drawing device and for supplying the three-dimensional image to a display device,
   wherein the drawing object information and the coordinate transformation information are separately and independently generated, stored and managed before the generation of the three-dimensional image by said drawing device.

2. An image generating apparatus according to claim 1, wherein the drawing object information storing device stores a plurality of units of the drawing object information generated by the drawing object information generating device, the coordinate transformation information storing device stores a plurality of units of the coordinate transformation information generated by the coordinate transformation information generating device, and the drawing device generates the three-dimensional image with an arbitrary combination of one or more than one of the plurality of units of the drawing object information and one or more than one of the plurality of units of the coordinate transformation information.

3. An image generating apparatus according to claim 1, wherein the drawing object information generating device comprises a list generating device for generating a list of the drawing object information.

4. An image generating apparatus according to claim 1, wherein the image generating apparatus includes a drawing application processor and a graphics library,
the graphics library comprises:
the drawing object information storing device;
the coordinate transformation information storing device; and
a controlling device for controlling the drawing device, and
the drawing application processor comprises:
the drawing object information generating device;
the coordinate transformation information generating device; and
an instructing device for instructing the controlling device to execute the generation of the three-dimensional image.

5. An image generating apparatus according to claim 4, wherein the image generating apparatus comprises a first portion and a second portion which are detachable from each other, the drawing application device is put on the first portion, and the graphics library and the drawing device are put on the second portion.

6. An image generating apparatus according to claim 1, further comprising:
a map information supplying device for supplying map information, which contains a source of the drawing object information, to the drawing object information generating device.

7. An image generating apparatus according to claim 1, wherein the drawing device generates the three-dimensional image with perspective.

8. An image generating apparatus according to claim 1, wherein the coordinate transformation information includes information for defining a light source.

9. An image generating apparatus according to claim 1, wherein the information for defining the view point is set on the basis of a view point of a movable body operator.

10. An image generating apparatus according to claim 1, wherein the coordinate transformation information defines the field of view on the basis of a field of view of a movable body operator.

11. An image generating apparatus according to claim 1, wherein the view point on the three-dimensional image is set so as to be located at a central portion of a display area of a display device.

12. An image generating apparatus according to claim 1, wherein the drawing device generates a plurality of partial frame images on the basis of the stored drawing object information, and superimposes the plurality of partial frame images.

13. An image generating apparatus according to claim 12 further comprising a frame buffer for storing the plurality of partial frame images.

14. An image generating apparatus according to claim 1, wherein the coordinate transformation information generating device generates a plurality of units of the coordinate transformation information, in which the view point, the field of view, or both of the view point and the field of view is/are different from each other, with respect to one unit of the drawing object information, and the image processing device generates the three-dimensional image which changes with time by applying the plurality of units of the coordinate transformation information to the one unit of the drawing object information.

15. An image generating apparatus according to claim 1, wherein a process of generating the drawing object information in the drawing object information generating device, a process of generating the coordinate transformation information in the coordinate transformation information generating device, a process of storing the drawing object information in the drawing object information storing device and a process of storing the coordinate transformation information in the coordinate transformation information storing device are carried out with multitasking.

16. An image generating apparatus according to claim 1 further comprising:
the display device for displaying the images generated by the drawing device.

17. A program storage device readable by a computer for tangibly embodying a program of instructions executable by the computer to perform an image generating method of drawing a three-dimensional image, the image generating method comprising:
a drawing object information generating process of generating drawing object information, which is information for drawing objects as the three-dimensional image, in a single coordinate system;
a coordinate transformation information generating process of generating coordinate transformation information, which is information for defining a view point, a field of view, or both of the view point and the field of view concerning the three-dimensional image, separately and independently from the drawing object information;
a drawing object information storing process of storing the drawing object information, separately and independently from the coordinate transformation information;
a coordinate transformation information storing process of storing the coordinate transformation information, separately and independently from the drawing object information; and
a drawing process for generating the three-dimensional image by using the drawing object information that is directly input from a drawing object information storing device that stores the drawing object information and the coordinate transformation information that is directly input from a coordinate transformation information storing device that stores the coordinate transformation information, and for supplying the three-dimensional image to a display device,
wherein the drawing object information and the coordinate transformation information are separately and independently generated, stored and managed before the generation of the three-dimensional image by said drawing process.

18. An image generating method of drawing a three-dimensional image comprising:
a drawing object information generating process of generating drawing object information, which is information for drawing objects as the three-dimensional image, in a single coordinate system;
a coordinate transformation information generating process of generating coordinate transformation information, which is information for defining a view point, a field of view, or both of the view point and the field of view concerning the three-dimensional image, separately and independently from the drawing object information;

a drawing object information storing process of storing the drawing object information, separately and independently from the coordinate transformation information;

a coordinate transformation information storing process of storing the coordinate transformation information, separately and independently from the drawing object information; and a drawing process for generating the three-dimensional image by using the drawing object information that is directly input from a drawing object information storing device that stores the drawing object information and the coordinate transformation information that is directly input from a coordinate transformation information storing device that stores the coordinate transformation information, and for supplying the three-dimensional image to a display device, wherein the drawing object information and the coordinate transformation information are separately and independently generated, stored and managed before the generation of the three-dimensional image by said drawing process.

19. An image generating method according to claim 18, wherein the drawing object information generating process comprises a list generating process of generating a list of the drawing object information.

* * * * *